United States Patent
Childress et al.

(10) Patent No.: US 7,750,799 B2
(45) Date of Patent: Jul. 6, 2010

(54) ENABLING A PERSON IN DISTRESS TO COVERTLY COMMUNICATE WITH AN EMERGENCY RESPONSE CENTER

(75) Inventors: Rhonda L. Childress, Austin, TX (US); David Bruce Kumhyr, Austin, TX (US); Stephen James Watt, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 761 days.

(21) Appl. No.: 11/555,293

(22) Filed: Nov. 1, 2006

(65) Prior Publication Data

US 2008/0102785 A1    May 1, 2008

(51) Int. Cl.
*G08B 1/08* (2006.01)
(52) U.S. Cl. .............. 340/539.13; 340/539.1; 340/539.11; 340/539.16; 340/539.17; 340/574; 455/404.1; 455/521
(58) Field of Classification Search ........... 340/574, 340/539.1–539.18; 455/404.1, 521
See application file for complete search history.

(56) References Cited

U.S. PATENT DOCUMENTS

| | | | | |
|---|---|---|---|---|
| 5,196,825 | A * | 3/1993 | Young | 340/539.11 |
| 5,995,847 | A | 11/1999 | Gergen | |
| 6,239,700 | B1 * | 5/2001 | Hoffman et al. | 340/539.13 |
| 6,574,484 | B1 | 6/2003 | Carley | |
| 6,636,732 | B1 * | 10/2003 | Boling et al. | 455/404.1 |
| 6,807,564 | B1 * | 10/2004 | Zellner et al. | 709/206 |
| 6,889,135 | B2 * | 5/2005 | Curatolo et al. | 701/207 |
| 6,909,903 | B2 | 6/2005 | Wang | |
| 7,092,695 | B1 * | 8/2006 | Boling et al. | 455/404.1 |
| 7,120,488 | B2 * | 10/2006 | Nova et al. | 607/2 |
| 7,486,194 | B2 * | 2/2009 | Stanners et al. | 340/574 |
| 2005/0197096 | A1 * | 9/2005 | Yang et al. | 455/404.1 |

OTHER PUBLICATIONS

"Safety and Security Center", pp. 1-2, retrieved Sep. 28, 2009, http://safetyandsecuritycenter.stores.yahoo.net/.
"GPS Panic Alarm", pp. 1-4, retrieved Sep. 28, 2009 http://www.halfbakery.com/idea/GPS_20Panic_20Alarm.
"Panic Button", Why Not, pp. 1-3, retrieved Sep. 28, 2009 http://www.whynot.net/view_idea?id=1077.
"9-1-1 Service", 1 page, retrieved Sep. 28, 2009 Http://www.fcc.gov/pshs/services/911-services/.
"Emergency Alert Dialer and Panic Remote Kit model MS2001", aaaremotes, Mega Access Controls, Inc., pp. 1-2 retrieved Oct. 4, 2009 http://www.aaaremotes.com/emaldiandpar1.html.

* cited by examiner

*Primary Examiner*—Daniel Wu
*Assistant Examiner*—Son M Tang
(74) *Attorney, Agent, or Firm*—Yee & Associates, P.C.; William H. Steinberg

(57) ABSTRACT

A means for a person in distress to use a mobile device to communicate covertly with an Emergency Response Center is provided. The means contains a response designed not to alert an abductor of the communication as well as to indicate whether the person is indeed in distress. The means also allows the Emergency Response Center to locate both the distressed person and a mobile device using GPS or triangulation. The device may be in regular operation mode or in distress mode. When the device is in the distress mode, it will appear to be in normal operating mode if in operation or it will appear to be off if off. In addition, the device may be used for forensic purposes since it may provide voice and video data of the situation at an emergency location to the Emergency Response Center.

20 Claims, 4 Drawing Sheets

ENABLING A PERSON IN DISTRESS TO COVERTLY COMMUNICATE WITH AN EMERGENCY RESPONSE CENTER

BACKGROUND OF THE INVENTION

1. Technical Field

The present invention is directed generally to emergency devices. More specifically, the present invention is directed to an apparatus, system and method of enabling a person in distress to covertly communicate with an Emergency Response Center.

2. Description of Related Art

A lot of modern cars are equipped with anti-theft devices. Due to these anti-theft devices, it has been getting harder for parked cars to get stolen. As a result, car thieves have resorted to stealing cars by taking car keys from drivers through either force or threat. When a car is stolen from a driver by means of force or threat, it is referred to as a carjacking.

In response to carjacking, many vehicles have been fitted with Global Positioning System (GPS) transmitters. When a car equipped with a GPS transmitter is stolen, the driver or owner of the car may place a call activating the GPS transmitter. Upon activation, the transmitter will provide the current location of the car to the owner or police. Hence, the car can be quickly recovered.

To stop owners from activating GPS transmitters of stolen cars, car thieves have started to take not only the cars but also the drivers. This places the drivers at great personal risk of harm.

There are a number of conventional devices or methods that a person in a distressed situation may use to summon help. For example, using a cellular telephone, the person may use Enhanced 911 (E911). E911 is a location identification technology that enables cellular telephone service providers to process 911 emergency calls and provide emergency services the geographic position of the caller. Armed with the location of the caller, emergency personnel may rescue the person.

Another device that may be used by a person in an emergency situation is a SkyLink Personal Security Systems Emergency Alert Dialer and Panic Remote Kit. The SkyLink Personal Security Systems Emergency Alert Dialer and Panic Remote Kit is an emergency alert telephone dialer. It may be configured with three direct access phone numbers that may be dialed remotely by a press of a button to send a prerecorded emergency voice message to pagers, cellular phones, offices, authorities, relatives, friends etc.

A further device that may be used by a person in an emergency situation is a cellular telephone with a panic button. The panic button is an oversized red emergency button integrated in a cellular telephone that may be pre-programmed to first contact a family member and if there is no response, perhaps a doctor or the police etc. Coupled with global positioning, the panic button may be quite effective in summoning for help.

Yet another device that may be used by a person in an emergency situation is an Emergency Medical Alarm Auto Dialer. The Emergency Medical Alarm Auto Dialer dials each phone number programmed therein, up to nine times each, and plays a forty-second pre-recorded message from one to nine times before going on to the next number in the list. In addition, the emergency auto dialer features a two-way communication capability via a speaker phone, allowing the person in distress to carry on a conversation with a person on the other end of the line. A wireless keychain transmitter offers three buttons in addition to the panic button to program with direct speed-dial numbers.

Further, a person in an emergency situation may use a GPS Panic Alarm to summon help. The panic alarm is a panic button type gadget which incorporates a GPS device. When the panic alarm is used, a police station number is dialed with a message that includes the exact location of the alarm.

As can be seen, none of the above-described methods or devices provide a manner by which a person in distress may covertly communicate with Emergency personnel.

Thus, a need exists for a method, computer program product and system of enabling a person in distress to covertly communicate with emergency personnel at an Emergency Response Center.

SUMMARY OF THE INVENTION

The present invention provides an apparatus, system and method of enabling a person in distress to covertly communicate with an Emergency Response Center either directly or through a service provider. When the person is in distress (e.g., abducted), the person may send an alert indicating an emergency situation to the Emergency Response Center. Upon receiving the alert, the Emergency Response Center will transmit a first agreed upon message to the person. The first agreed upon message will appear not to be in response to the alert, lest retribution may be taken by the abductor.

If the person responds to the first agreed upon message using a second agreed upon message, then it can be interpreted that the person is in danger and rescue operations are to commence immediately. Likewise, if the person does not respond to the first agreed upon message within an agreed upon time frame, then it can be interpreted that the person is in danger and rescue operations are to commence immediately. If, however, the person responds to the first agreed upon message using a passcode, for instance, it can be interpreted that the alert was inadvertently transmitted and rescue operations will not commence.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
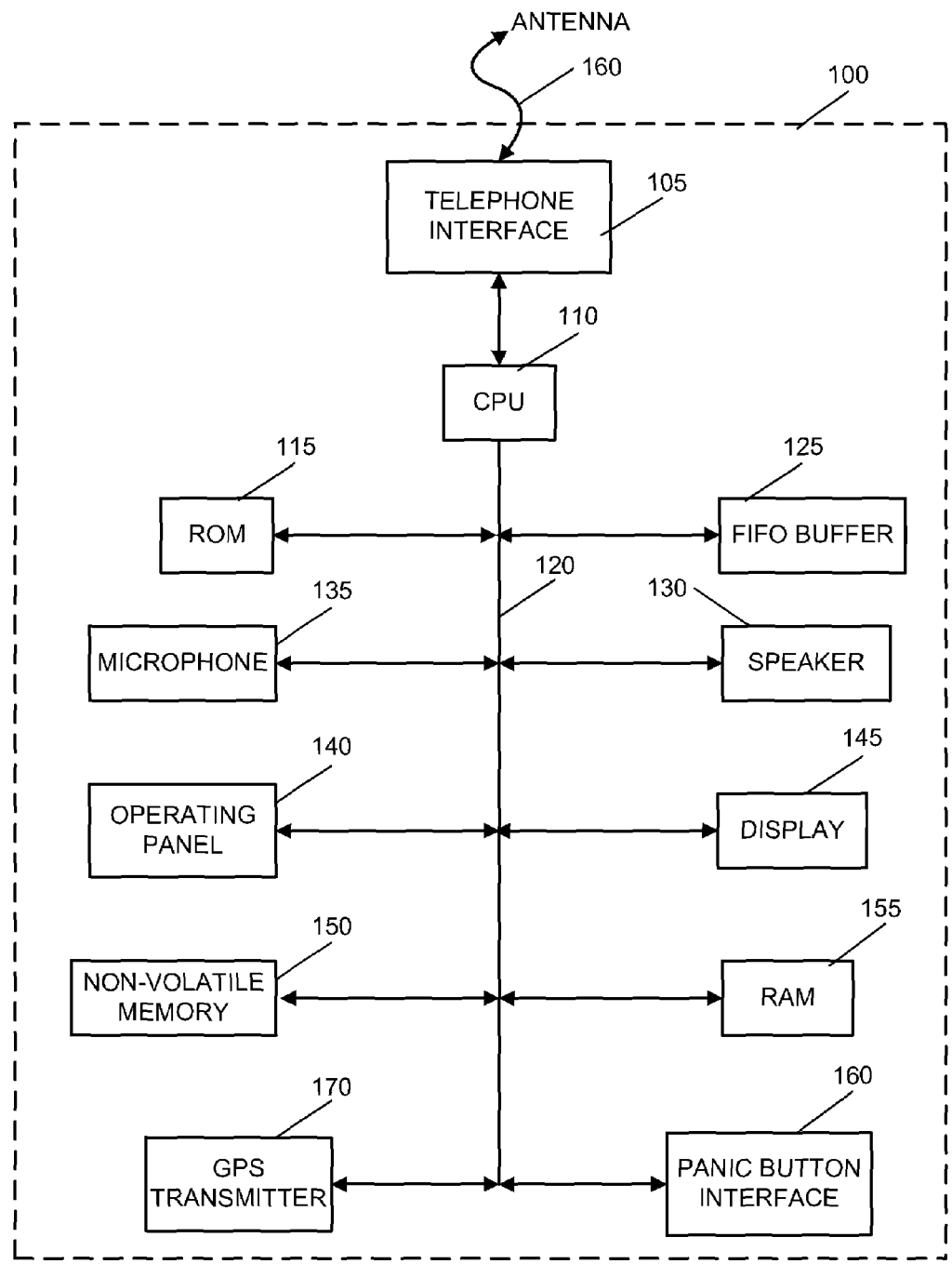
FIG. 1 depicts an exemplary schematic block diagram of a cellular telephone apparatus.

The present invention provides a means for a person to use a mobile device to communicate covertly with an Emergency Response Center. The means provided by the invention is similar to a household silent alarm system. However, it contains a response designed not to alert an abductor of the communication. Specifically, the means provided by the invention may be a panic button integrated in the mobile device that, when depressed, summons the Emergency Response Center for help. The means also allows the Emergency Response Center to locate the person, if the person becomes separated from the mobile device, through a personal transmitter that may be worn by the person. Both the person and the mobile device may be located using GPS signals or triangulation.

Note that when the device is in the panic mode, it will appear to be in normal operating mode if the device is in operation or it will appear to be off if it is off.

Note further the device may be used for forensic purposes since it may provide voice and video data of the situation at the emergency location to the Emergency Center. Further, note that the Emergency Response Center may ascertain whether or not the button was depressed accidentally, by covertly communicating with the abducted person.

The present invention will be explained using a cellular telephone. However, it should be understood that the invention is not thus restricted. Any mobile device (e.g., wireless PDAs, pagers, wireless electronic watches) is well within the scope of the invention. Thus, the use of the cellular telephone to explain the invention is for illustrative purposes only.

Further, note that although a panic button on the mobile device is used to send the alarm, the present invention is not thus restricted. For example, the panic button may be incorporated in the personal transmitter the person wears rather than in the mobile device. In addition, the person may push a sequence of keys on the mobile device to send the alarm instead of depressing a panic button. Depending on the implementation of the device, the sequence of keys may or may not be user-configurable.

The alarm may be broadcasted rather than sent directly to the Emergency Response Center. The alarm may be raised by having the mobile device constantly listen for a specific innocuous phrase that has been audibly uttered instead of through the panic button or the entry of a sequence of keys. In this case, the owner's voice signature may be used to trigger the alarm once the phrase is uttered. Hence, a person may raise the alarm although tied up so long as the mobile device, for instance, is within voice range.

Note, in addition, that the word "alarm" and the term "distress signal" will be used interchangeably throughout the rest of the disclosure to explain the invention. Also, note that the "alarm" or "distress signal" may be "sent" or "broadcasted" to the "Emergency Response Center" or to a "cellular telephone service provider".

Consequently, the use of the word "alarm", and term "distress signal", as well as the use of the words "sent", "broadcasted", and the terms "panic button", and "Emergency Response Center, etc. are all used for illustrative purposes only.

Turning to the figures, FIG. 1 depicts a schematic block diagram of a cellular or wireless telephone apparatus 100 incorporating the present invention. The wireless telephone apparatus 100 is connected to an antenna 160 through a wireless interface 105. The wireless interface 105 is connected to CPU 110. CPU 110 is connected to ROM 115, first-in, first-out (FIFO) buffer 125, ear speaker 145, loud speaker 130, microphone 135, operating panel 140, non-volatile memory 150, RAM 155, panic button interface 160 and a GPS transmitter via a bus 120.

With the use of a software utility package stored in ROM 115, CPU 110 performs various functions. For example, the CPU 110 may send a ring tone to ear speaker 130 whenever the antenna interface 105 detects a ring signal. Likewise, CPU 110 may send a busy tone signal to ear speaker 130 when the antenna interface 105 detects a busy signal. Furthermore, when a dial tone is detected, CPU 110 may send the dial tone to ear speaker 130. If the CPU 110 detects that a speaker phone button (see FIG. 2) has been depressed, it may send the aforementioned tones to speaker 145 instead of to ear speaker 130. Microphone 135 allows for communication without holding the telephone to one's ear. Non-volatile memory 150 is used to store a phone book and FIFO buffer 125 is used to store the most recently dialed number for the redial feature.

Figure 2:
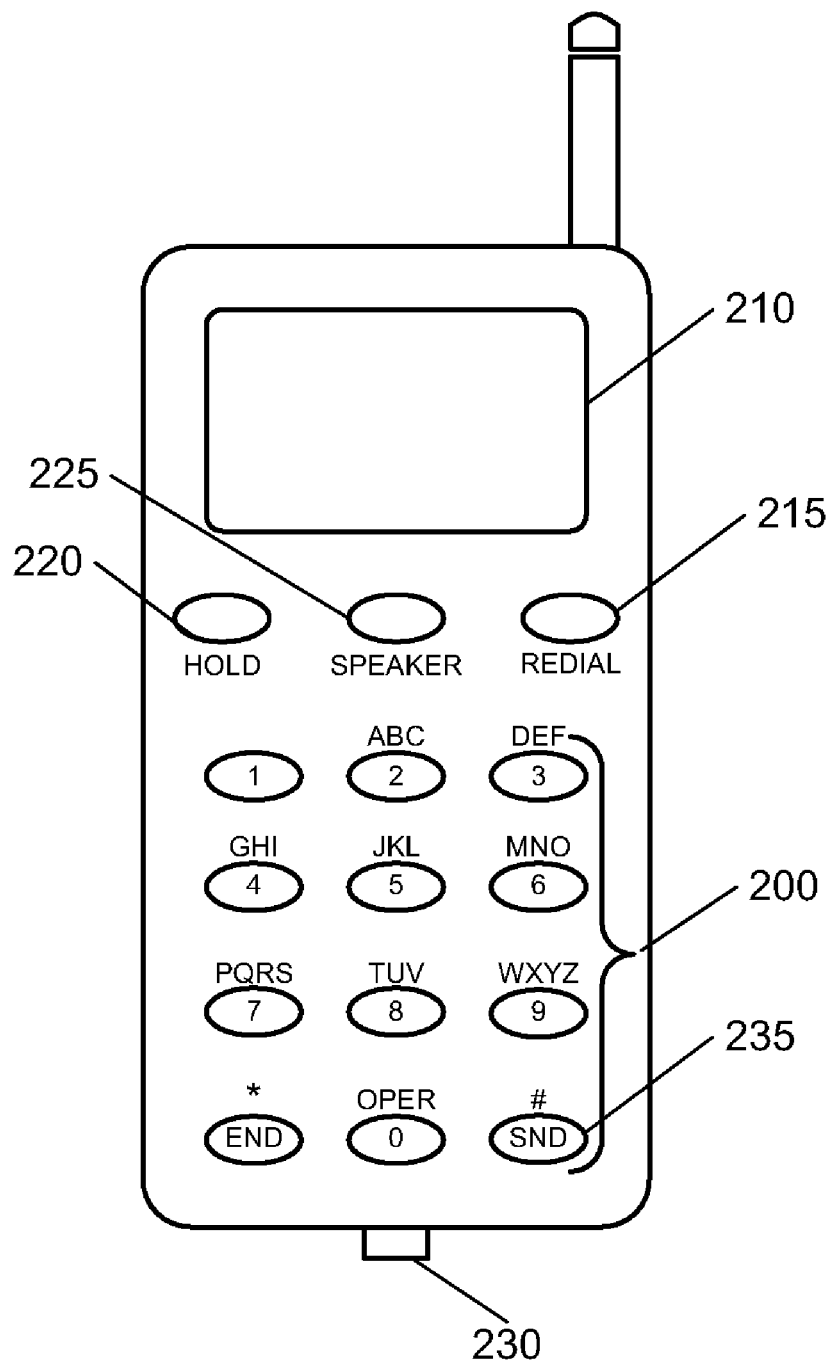
FIG. 2 depicts an exemplary operating panel of the cellular telephone.

FIG. 2 depicts operating panel 140. The operating panel 140 contains an LCD (Liquid Crystal Display) screen 210 and a dial pad 200. The LCD screen 210 may be used to display a telephone number that is being dialed or has been dialed as well as to display the telephone number of an incoming call. Dial pad 200 may be used for dialing numbers. Hold button 220 may be used for putting a person with whom the user is communicating on hold. Redial button 220 may be used to dial a previously dialed number and speaker phone button 225 allows for one to communicate without holding the telephone to one's ear. Send button 235 allows a user to actually place a call and button 230 is a panic button.

When the panic button 230 is depressed, the panic button interface 160 sends a signal to CPU 110. In response to the signal, CPU 110 retrieves code of the present invention that may be stored in ROM 115 or in certain instances on a hard drive, or on a compact disc (CD) or on any medium that may be used to store data so long as the device is equipped to read data from the medium. After retrieving the code, CPU 110 may process the code and directs the GPS transmitter 170 to emit a location identifier signal as a result. The signal allows the Emergency Response Center to track down the location of the cellular telephone.

Emergency signal transmitters have been miniaturized and are now able to be carried discretely by a person (An example of such miniaturization, is the emergency signal transmitter watches manufactured by Breitling). The signal from a Breitling emergency watch is immediately identifiable as it contains the letter B in Morse code. This makes the transmission stand out from clutters of false alarms and non-aviation related signals on 121.5 MHz. Thus, a transmission from a Breitling emergency watch means that there is a downed aircraft and immediate assistance is required.

The present invention also advocates the use of a personal emergency transmitter that may be worn by the abducted person. Just as in the case of the Breitling, the personal emergency transmitter may be incorporated into a watch. In other cases, the personal emergency transmitter may be integrated in a wallet, a pair of glasses or in any item that is unlikely to be separated from an abducted person. The personal transmitter may be activated by the cellular telephone. That is, the location identifier signal emitted by the transmitter 170 may trigger the personal transmitter to start emitting its signal.

Figure 3:
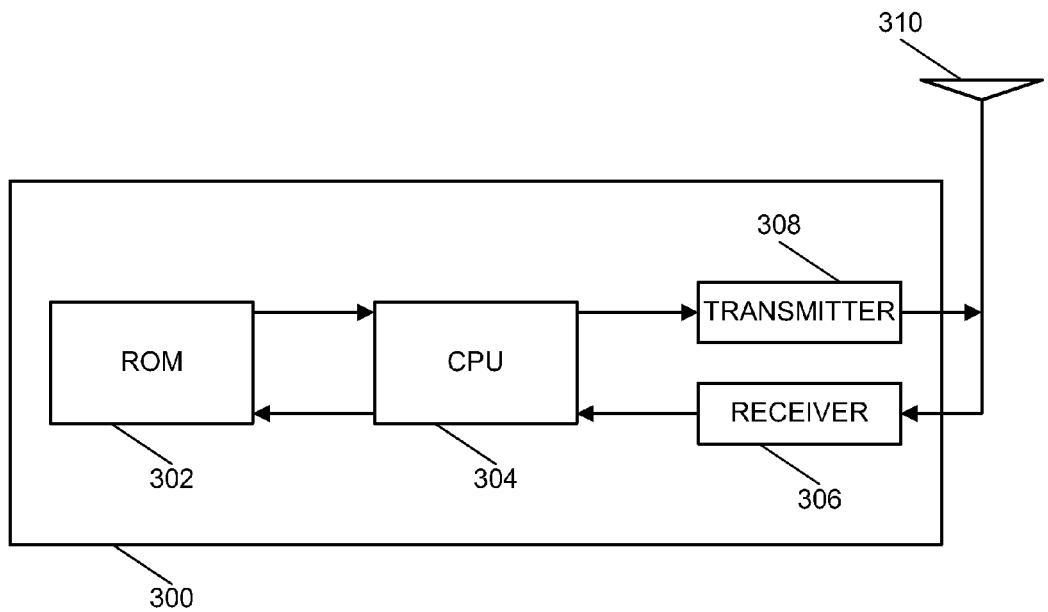
FIG. 3 depicts an exemplary chip that may be used to implement a personal emergency transmitter.

FIG. 3 depicts an exemplary chip 300 that may be used to implement the personal emergency transmitter. The chip 300 contains an antenna 310 for receiving the triggering signal from the transmitter 170 at receiver 306 and for emitting the personal transmitter signal through transmitter 308. Specifically, when the triggering signal is received from the transmitter 170, CPU 304 retrieves code from ROM 302 that will enable it to transmit the personal transmitter signal through transmitter 308.

Thus, when the panic button 230 is depressed, both the cellular telephone and the personal transmitter will begin transmitting their respective location. If the person becomes separated from the cellular telephone, the person may still be found through the personal transmitter. If the abductor takes the cellular telephone from the person and for whatever reason abandons the person, both the person and the abductor will be found.

Note that although the invention uses a GPS transmitter incorporated into the cellular telephone to identify the location of the telephone, cellular telephone triangulation may instead be used for location identification. Likewise, the location of the personal transmitter can be found through triangulation.

In an alternative embodiment, the personal transmitter may be a Bluetooth enabled device (i.e., can be much smaller than GPS transmitters) which simply broadcasts its location to the cellular telephone. The cellular telephone device can then pass this information on to the Emergency Response Center. The information can be used to determine whether the user and the mobile device have been separated as well as the time and location of the separation. The time and location of the separation of the person from the cellular telephone may serve as a starting point in the search of the person which may include cordoning off an immediate neighborhood to prevent anyone from leaving the area with or without the person.

Upon receiving the signal from either the GPS transmitter in the cellular telephone or the personal transmitter or both the GPS transmitter and personal transmitter, the Emergency Response Center may send a text message (i.e., through a Short Message Service) within a configurable time period. The message may be a pre-agreed upon innocuous message such as: "Hey Sam, are you still coming over for pizza?" The message may also be customized for the caller and circumstances as well as for time of day, location etc. The person may be alerted of the arrival of the message via a standard alert issued by the cellular telephone such as a chime, tune or vibration. As mentioned above, in view of the innocuousness of the message, the abductor may not know the true purpose of the message.

The person may answer the message by either canceling the alarm or by responding to the message. If the abductor instructs the person to respond to the message, the person may respond with a pre-agreed upon response that matches the pre-agreed upon question. Consequently, the response will not allude to the situation at hand. Nonetheless, the response will alert the Emergency Response Center of the situation.

If the person does not respond to the message, it may be because the abductor instructs the person to turn the device off or to ignore the message. In any case, cancellation of the alarm is expected.

The alarm may only be canceled by the person. A star (*) followed by a number (i.e., a pin number or a passcode), for example, may be used to cancel the alarm. Thus, if the person has accidentally depressed the panic button 230, the person at that point may enter the pin number to de-activate the alarm. When the alarm is de-activated, a text message may be sent to the Emergency Response Center indicating so. If an incorrect pin number is entered or if no response is received within an agreed upon time period, then rescue procedures may start immediately.

Note that once the panic button has been depressed, the cellular telephone will go into an alarm mode. In the alarm mode, the cellular telephone will appear to be off (i.e., lights and screens will be off and incoming audio muted) if it is turned off. Thus, there will not be any indication that the panic button has been depressed upon inspection. One of the reasons for not indicating whether the panic button has been depressed is to protect the abducted person from retribution.

However, although there is not any indication of the alarm, the cellular telephone will continue to relay audio information of the situation to the Emergency Response Center. If the cellular telephone is fitted with a camera, it will also transmit video information of the situation to the Emergency Response Center.

Figure 4:
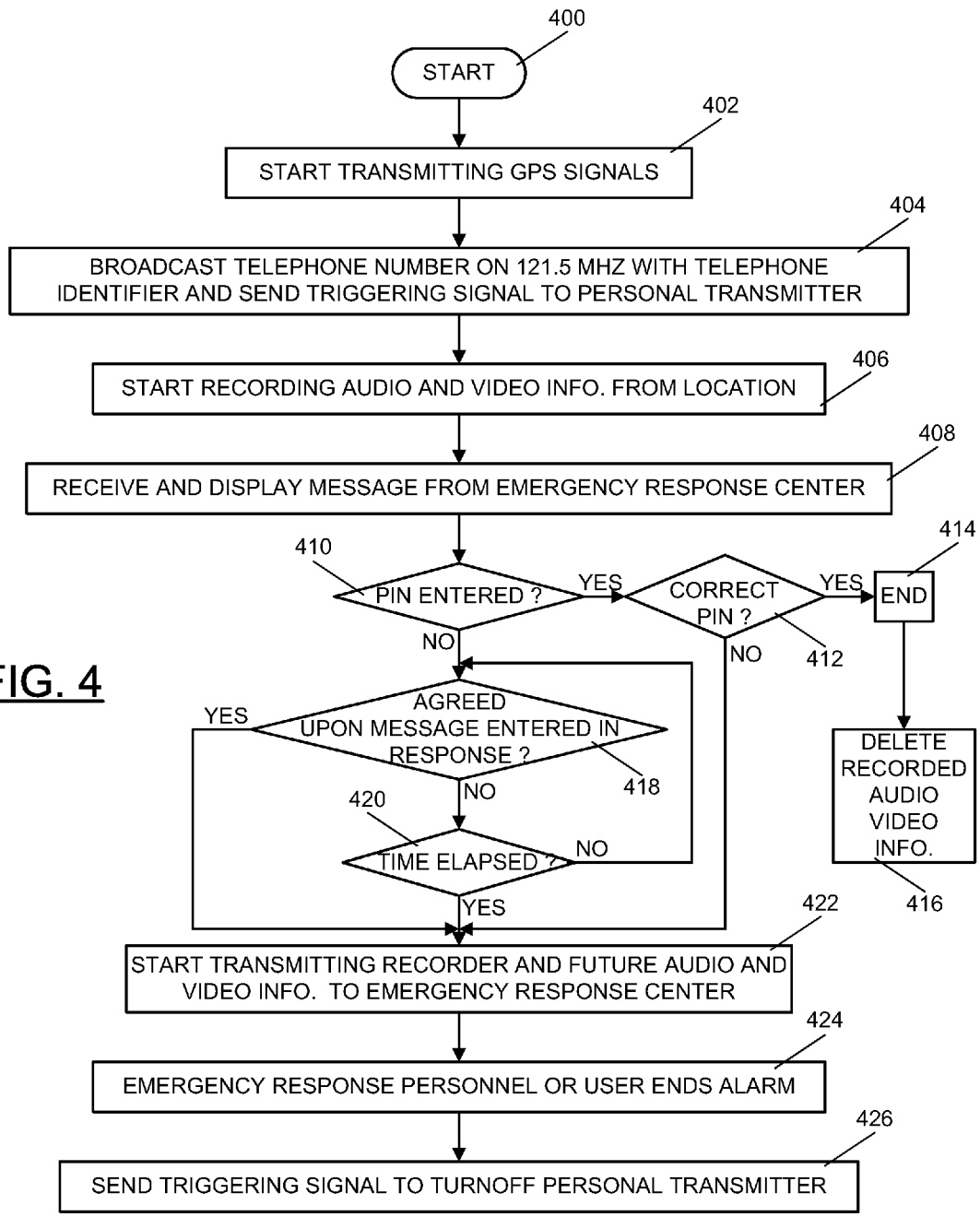
FIG. 4 is a flowchart of a process through which the cellular telephone may go according to the teachings of the invention.

FIG. 4 is a flowchart of a process through which the cellular telephone may go according to the teachings of the invention. The process starts when the panic button 230 is pressed (step 400). After the panic button has been depressed, the telephone will start transmitting GPS signals (step 402), broadcast its number on 121.5 MHZ with a telephone identifier (i.e., capital letter T for telephone) and send a triggering signal to the personal transmitter worn by the person in distress (step 404). After transmitting the triggering signal, the cellular telephone will start recording audio and video (if equipped with a camera) information at its location (step 406). If the cellular telephone receives a message from the Emergency Response Center, it will display the message to the person with the accompanying chime, tune or vibration (step 408).

As mentioned before, if it is a false alarm, the person at that point will cancel the alarm by keying in a pin number. A check will be made to determine whether a pin is entered (step 410) and if so, another check will made to determine if the pin entered is the correct one (step 412). If the correct pin is entered, the alarm will be canceled and the process ends (step 414). Once the process ends, the recorded audio and video information will be deleted from the cellular telephone (step 416). If, however, the wrong pin is entered, it is an indication that the person is indeed in distress. Thus, the process will jump to step 422.

If a pin is not entered, a check will be made to determine whether the response to the message from the Emergency Response Center is an agreed upon message (steps 410 and 418). If the response is the agreed upon message, it is an indication that the person is indeed in distress and the process will jump to step 422. If the agreed upon message is not entered, a check will made to determine whether a pre-agreed upon time within which the person is to respond to the message from the Emergency Response Center has elapsed. If the time has elapsed, it is an indication that the person is in distress and the process will jump to step 422 (steps 418, 420 and 422).

At step 422, the recorded audio and video information as well as future audio and video information will be transmitted to the Emergency Response Center. In this case, Emergency Response personnel may end the process after rescuing the person or the person may end the process after being rescued (step 424). Once the process ends, the cellular telephone may send the triggering signal once more to turn the personal transmitter off (step 426).

Figure 5:
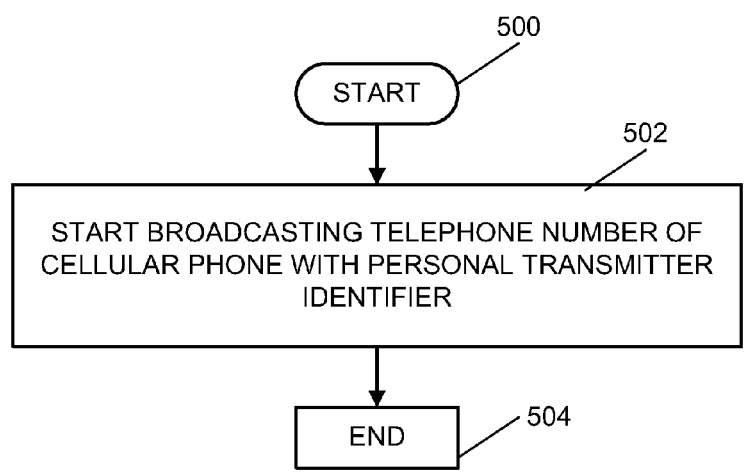
FIG. 5 is a flowchart of a process through which the personal transmitter may go according to the teachings of the invention

FIG. 5 is a flowchart of a process through which the personal transmitter may go according to the teachings of the invention. The process starts when the personal transmitter receives the triggering signal from the cellular telephone (step 500). After receiving the triggering signal, the personal transmitter will start broadcasting the number of the cellular telephone with a personal transmitter identifier (i.e., capital letter P for personal) until the cellular telephone send the triggering signal a second time to turn off the personal transmitter (steps 502 and 504).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of covertly communicating between a person in distress and an Emergency Response Center using a mobile device, the method comprising the steps of:
    sending by the person in distress an alert indicating an emergency situation to the Emergency Response Center using the mobile device;
    receiving, by the mobile device, a first agreed upon message from the Emergency Response Center, the first agreed upon message being from the Emergency Response Center in response to the alert while appearing not to be in response to the alert; and
    displaying, by the mobile device, the first agreed upon message to the person in distress;
    wherein after receiving the first agreed upon message, the mobile device sends a data to a processor of a personal transmitter, carried and concealed by the person in distress separately from the mobile device, to cause the processor to start transmitting a location identification.

2. The method of claim 1 wherein the person in distress responds to the first agreed upon message by a second agreed upon message.

3. The method of claim 2 wherein upon receiving the second agreed upon message, the Emergency Response Center commences rescue procedures.

4. The method of claim 1 wherein sending an alert by the person in distress further comprises:
    listening, by the mobile device, for an utterance of a specific phrase in a voice signature of the person in distress, and sending the alert in response to a recognition of the utterance of the specific phrase in the voice signature of the person in distress to the Emergency Response Center; and
    sending a data to the personal transmitter worn by the person in distress to cause a processor of the personal transmitter to record an audio information of the emergency situation.

5. The method of claim 4 wherein if the mobile device includes an integrated video camera, a video information is recorded along with the audio information.

6. The method of claim 1 wherein if a cancel alarm signal is not sent to the Emergency Response Center within an agreed upon elapsed time, the Emergency Response Center commences one or more rescue procedures.

7. The method of claim 1 wherein the data is a passcode.

8. A computer program product on a computer readable medium for enabling covert communication between a person in distress and an Emergency Response Center using a mobile device, the computer program product comprising:
    a computer readable storage medium;
    a plurality of instructions stored in the computer readable storage medium, the plurality of instructions configured to cause a processor of a mobile device to perform actions comprising:
    enabling the person in distress to send an alert indicating an emergency situation to the Emergency Response Center using the mobile device;
    receiving, by the mobile device, a first agreed upon message from the Emergency Response Center, the first agreed upon message being from the Emergency Response Center in response to the alert while appearing not to be in response to the alert;
    displaying, by the mobile device, the first agreed upon message to the person in distress;
    sending a data to a processor of a personal transmitter, carried separately from the mobile device by the person in distress, to cause the processor to start transmitting a location identification.

9. The computer program product of claim 8 further comprising a code means for enabling the person in distress to respond to the first agreed upon message using a second agreed upon message.

10. The computer program product of claim 9 wherein upon receiving the second agree upon message, the Emergency Response Center commences rescue procedures.

11. The computer program product of claim 10 further comprising:
    causing the mobile device to listen for an utterance of a specific phrase in a voice signature of the person in distress, and sending the alert in response to a recognition of the utterance of the specific phrase in the voice signature of the person in distress to the Emergency Response Center; and
    causing the mobile device to send a data to the personal transmitter worn by the person in distress to cause the personal transmitter to start transmitting a location identification and to begin to record an audio information of the emergency situation.

12. The computer program product of claim 11 wherein if the mobile device includes an integrated video camera, video information is recorded along with the audio information.

13. The computer program product of claim 8 wherein if a cancel alarm signal is not sent to the Emergency Response Center within an agreed upon elapsed time, the Emergency Response Center commences rescue procedures.

14. The method of claim 13 wherein the cancel alarm signal is a passcode.

15. A system for enabling a person in distress to covertly communicate with an Emergency Response Center comprising:
    a mobile device, having a first processor, connected to a personal transmitter, having a second processor, and to the Emergency Response Center, wherein the personal transmitter is carried by the person in distress separately from the mobile device;
    a storage device connected to a processor of the mobile device;
    a plurality of instructions and a plurality of code data stored in the storage device, the plurality of instructions configured to cause the processor, responsive to an action by the person in distress, to send an alert indicating an emergency situation to the Emergency Response Center, to receive a first agreed upon message from the Emergency Response Center, the first agreed upon message being in response to the alert while appearing not to be in response to the alert, to display the first agreed upon message to the person in distress; responsive to agreed upon message, sending a second message to the Emergency Response Center, and responsive to sending the second message, sending a data to the second processor of the personal transmitter to cause the personal transmitter to start transmitting a location identification.

16. The system of claim 15 wherein the person in distress responds to the first agreed upon message by a second agreed upon message.

17. The system of claim 16 wherein upon receiving the second agreed upon message, the Emergency Response Center commences rescue procedures.

18. The system of claim 17 wherein the mobile device listens for an utterance of a specific phrase in a voice signature of the person in distress, and sends the alert in response to a recognition of the utterance of the specific phrase in the voice signature of the person in distress to the Emergency Response Center; and the mobile device sends a data to the personal transmitter worn by the person in distress to start transmitting a location identification and to begin to record audio information of the emergency situation.

19. The system of claim 18 wherein if the mobile device includes an integrated video camera, video information is recorded along with the audio information.

20. The system of claim 15 wherein if a cancel alarm signal is not sent to the Emergency Response Center within an agreed upon elapsed time, the Emergency Response Center commences rescue procedures.

* * * * *